(12) United States Patent
Beyer et al.

(10) Patent No.: US 7,756,219 B2
(45) Date of Patent: Jul. 13, 2010

(54) LOW-IF MULTIPLE MODE TRANSMITTER FRONT END AND CORRESPONDING METHOD

(75) Inventors: Sascha Beyer, Ottendorf-Okrilla (DE); Wolfram Kluge, Dresden (DE); Michael Schmidt, Dresden (DE)

(73) Assignee: GLOBALFOUNDRIES Inc., Grand Cayman (KY)

( * ) Notice: Subject to any disclaimer, the term of this patent is extended or adjusted under 35 U.S.C. 154(b) by 1398 days.

(21) Appl. No.: 11/181,152

(22) Filed: Jul. 14, 2005

(65) Prior Publication Data

US 2006/0067429 A1    Mar. 30, 2006

(30) Foreign Application Priority Data

Sep. 30, 2004    (DE)    ........................ 10 2004 047 683

(51) Int. Cl.
    *H04L 27/04*    (2006.01)
(52) U.S. Cl. ........................ 375/309; 375/135; 375/141; 375/146; 375/260
(58) Field of Classification Search ................. 375/150, 375/350, 301, 308, 239, 135, 146, 260, 298, 375/299, 141, 309; 370/395.5, 464, 469, 370/395.65, 432; 455/69, 102, 103
    See application file for complete search history.

(56) References Cited

U.S. PATENT DOCUMENTS

| | | | | |
|---|---|---|---|---|
| 3,147,437 A | * | 9/1964 | Crafts et al. | 455/46 |
| 4,635,004 A | * | 1/1987 | Ishigaki | 332/170 |
| 5,808,493 A | * | 9/1998 | Akiyama et al. | 327/159 |
| 2002/0080728 A1 | * | 6/2002 | Sugar et al. | 370/252 |
| 2002/0193140 A1 | * | 12/2002 | Behrens et al. | 455/553 |
| 2003/0117201 A1 | * | 6/2003 | Wang | 327/254 |

(Continued)

FOREIGN PATENT DOCUMENTS

WO    03/009483    1/2003

OTHER PUBLICATIONS

Milic et al. "desing of miltiplierpless elliptic IIR filters with a small quantization error";IEEE transaction on signal processing,vol. 47, No. 2, Feb. 1999, pp. 469-478.*

(Continued)

*Primary Examiner*—David C Payne
*Assistant Examiner*—Rahel Guarino
(74) *Attorney, Agent, or Firm*—Meyertons, Hood, Kivlin, Kowert & Goetzel, P.C.

(57) ABSTRACT

A WLAN transmitter capable of transmitting data signals modulated in accordance with an individual one of at least two different modulation schemes and corresponding methods and integrated circuit chips are provided. The WLAN transmitter contains a front end section having a low-IF topology and including a digital front end unit and an analog front end unit. The digital front end unit contains a first signal processing branch for processing transmission data signals modulated in accordance with a first one of said at least two different modulation schemes. The digital front end unit further contains a second signal processing branch for processing transmission data signals modulated in accordance with a second one of said at least two different modulation schemes. The analog front end unit contains one single signal processing branch for processing transmission data signals modulated in accordance with any one of said at least two different modulation schemes.

91 Claims, 6 Drawing Sheets

U.S. PATENT DOCUMENTS

| | | |
|---|---|---|
| 2003/0153293 A1* | 8/2003 | Richter et al. ............... 455/302 |
| 2003/0179833 A1* | 9/2003 | Porco et al. ................. 375/297 |
| 2004/0152418 A1* | 8/2004 | Sinha et al. ................... 455/42 |
| 2004/0259518 A1* | 12/2004 | Aktas et al. ................. 455/323 |
| 2005/0181800 A1* | 8/2005 | Trachewsky et al. ..... 455/452.1 |
| 2005/0186986 A1* | 8/2005 | Hansen et al. ........... 455/553.1 |
| 2007/0275675 A1* | 11/2007 | Darabi et al. ............... 455/118 |

OTHER PUBLICATIONS

Translation into English of Office Action, Application No. 10 2004 047 683.7-35, Jul. 29, 2005.

* cited by examiner

LOW-IF MULTIPLE MODE TRANSMITTER FRONT END AND CORRESPONDING METHOD

BACKGROUND OF THE INVENTION

1. Field of the Invention

The invention generally relates to data communications devices such as WLAN (Wireless Local Area Network) transmitters and corresponding methods, and particularly to front end techniques in such devices.

2. Description of the Related Art

A Wireless Local Area Network is a flexible data communications system implemented as an extension to or as an alternative for a wired LAN. Using radio frequency or infrared technology, WLAN systems transmit and receive data over the air, minimizing the need for wired connections. Thus, WLAN systems combine data connectivity with user mobility.

Today, most WLAN systems use spread spectrum technology, a wideband radio frequency technique developed for use in reliable and secure communications systems. The spread spectrum technology is designed to trade off bandwidth efficiency for reliability, integrity and security. Two types of spread spectrum radio systems are frequently used: frequency hopping and direct sequence systems.

The standard defining and governing Wireless Local Area Networks that operate in the 2.4 GHz spectrum is the IEEE 802.11 standard. To allow higher data rate transmissions, the standard was extended to 802.11b that allows data rates of 5.5 and 11 Mbps in the 2.4 GHz spectrum. Further extensions exist.

Examples of these extensions are the IEEE 802.11a, 802.11b and 802.11g standards. The 802.11a specification applies to wireless ATM (Asynchronous Transfer Mode) systems and is primarily used in access hubs. 802.11a operates at radio frequencies between 5 GHz and 6 GHz. It uses a modulation scheme known as Orthogonal Frequency Division Multiplexing (OFDM) that makes possible data speeds as high as 54 Mbps, but most commonly communications take place at 6 Mbps, 12 Mbps or 24 Mbps. The 802.11b standard uses a modulation method known as Complementary Code Keying (CCK) which allows high data rates and is less susceptible to multi-path propagation interference. Occasionally, the CCK modulation scheme is also referred to as DSSS-CCK (Direct Sequence Spread Spectrum CCK) modulation. The 802.11g standard can use data rates of up to 54 Mbps in the 2.4 GHz frequency band using OFDM. Since both 802.11g and 802.11b operate in the 2.4 GHz frequency band, they are completely interoperable. The 802.11g standard defines CCK-OFDM as an optional transmit mode that combines the access modes of 802.11a and 802.11b and which can support transmission rates of up to 22 Mbps.

WLAN transmitters and other data communications devices usually have a system unit that processes radio frequency (RF) signals. This unit is usually called front end. Basically, a front end comprises radio frequency filters, intermediate frequency (IF) filters, multiplexers, modulators, amplifiers, and other circuits that could provide such functions as amplification, filtering, conversion and more. Referring to FIG. 1, the front end usually includes a digital front end 100 which is the digital portion of a circuit which precedes digital-to-analog conversion. Thus, the digital front end 100 performs some digital signal processing and then outputs the digital signal to a digital-to-analog converter 110. The converted, i.e., analog, output signal of the digital-to-analog converter 110 is then supplied to an analog front end 120.

As can be seen from FIG. 1, the analog front end 120 of conventional data communications transmitters may have an analog signal processing unit 130 for, e.g., filtering or amplifying the analog signal received from the digital-to-analog converter 110. Then, a unit 140 may upconvert the signal output by the analog signal processing unit 130. Conventionally, baseband carriers conveying data by way of some modulation technique are upconverted from baseband to some other intermediate frequency through a process called mixing. Following the mixing process, the IF signal is further upconverted to an RF frequency in the desired transmission frequency band.

Transmitter architectures exist where unit 140 has zero-IF and/or low-IF topology. This will now be explained in more detail with reference to FIGS. 2 and 3.

FIG. 2 is a simplified diagram illustrating the zero-IF approach for integrated transmitters. In the zero-IF approach, the incoming signal which is at baseband (BB) frequency, is converted by mixer 200 directly to the transmission RF frequency. Such direct conversion architectures have simplified filter requirements and can be integrated in a standard silicon process, making this design potentially attractive for wireless applications. However, there may be problems with the DC offset, I/Q mismatch, and with low frequency noise.

FIG. 3 illustrates the low-IF approach. As can be seen, the low-IF architecture operates at an intermediate frequency close to the baseband (like the zero-IF approach) and can therefore be integrated like the zero-IF circuits. However, there are two upconverters 300 and 310 to convert the baseband frequency signals to intermediate frequency and then from intermediate frequency to the transmission RF frequency. Low-IF devices can avoid the problems of DC offset, I/Q mismatch and low-frequency noise, but may require additional LO-feedthrough cancellation. For this reason, an LO-feedthrough cancellation unit 320 is added in the low-IF topology.

Thus, the zero-IF and low-IF approaches each have their own advantages and disadvantages. This is why conventional communications devices exist that use either the zero-IF approach or the low-IF approach in the analog front end. Further, dual band RF transceivers for WLAN systems exist where a direct conversion technique is used for one WLAN mode and a low-IF architecture is used for another WLAN mode.

SUMMARY OF THE INVENTION

An improved multi-mode data communications technique is provided that may improve reliability, reduce implementation complexity and/or increase flexibility.

According to an embodiment, a WLAN transmitter capable of transmitting data signals modulated in accordance with an individual one of at least two different modulation schemes is provided. The WLAN transmitter contains a front end section having a low-IF topology and including a digital front end unit and an analog front end unit. The digital front end unit contains a first signal processing branch for processing transmission data signals modulated in accordance with a first one of said at least two different modulation schemes. The digital front end unit further contains a second signal processing branch for processing transmission data signals modulated in accordance with a second one of said at least two different modulation schemes. The analog front end unit contains one single signal processing branch for processing transmission data signals modulated in accordance with any one of said at least two different modulation schemes.

In a further embodiment, a method for processing transmission data signals in a WLAN data communications device is provided. The transmission data signals are modulated in accordance with either one of at least two different modulation schemes. The WLAN data communications device contains a front end section having a low-IF topology and including a digital front end unit and an analog front end unit. It is determined which one of said at least two different modulation schemes is applied to a transmission data signal. Digital low-IF processing is performed on the transmission data signal in a first signal processing branch of the digital front end unit if it is determined that a first one of said at least two different modulation schemes is applied. If it is determined that a second one of said at least two different modulation schemes is applied, the digital low-IF processing is performed in a second signal processing branch of the digital front end unit. Analog low-IF processing of the transmission data signal is performed in one single signal processing branch of the analog front end unit if it is determined that the first one of said at least two different modulation schemes is applied and if it is determined that the second one of said at least two different modulation schemes is applied.

In another embodiment, an integrated circuit chip having circuitry for processing transmission data signals modulated in accordance with an individual one of at least two different modulation schemes is provided. The circuitry contains a front end circuit having a low-IF topology and including a digital front end circuit and an analog front end circuit. The digital front end circuit contains a first signal processing branch for processing transmission data signals modulated in accordance with a first one of said at least two different modulation schemes. The digital front end circuit further contains a second signal processing branch for processing transmission data signals modulated in accordance with a second one of said at least two different modulation schemes. The analog front end circuit contains one single signal processing branch for processing transmission data signals modulated in accordance with any one of said at least two different modulation schemes.

BRIEF DESCRIPTION OF THE DRAWINGS

The accompanying drawings are incorporated into and form a part of the specification for the purpose of explaining the principles of the invention. The drawings are not to be construed as limiting the invention to only the illustrated and described examples of how the invention can be made and used. Further features and advantages will become apparent from the following and more particular description of the invention, as illustrated in the accompanying drawings, wherein.

DETAILED DESCRIPTION OF THE INVENTION

The illustrative embodiments of the present invention will be described with reference to the figure drawings wherein like elements and structures are indicated by like reference numbers.

As will be apparent from the more detailed description of the embodiments, a multi-mode data communications transmitter technique is provided where the digital front end has two or more branches for different modulation schemes and each branch has low-IF topologies. It may be seen from the following description that the use of two (or more) low-IF branches in the digital transmitter front end may improve the reliability of the transmitter architecture.

Figure 1:
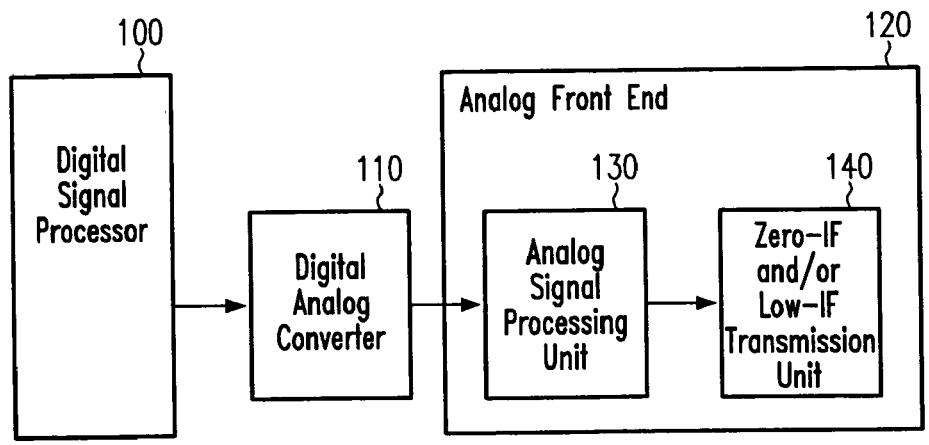
FIG. 1 is a block diagram illustrating the front end of a conventional data communications transmitter.
Figure 2:
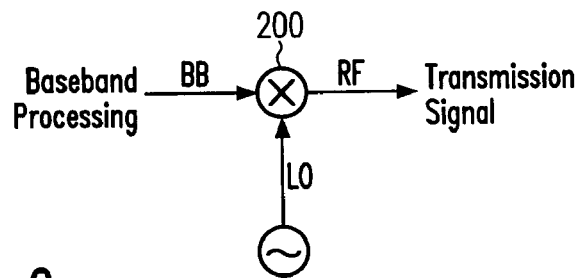
FIG. 2 is a simplified diagram illustrating the zero-IF approach.
Figure 3:
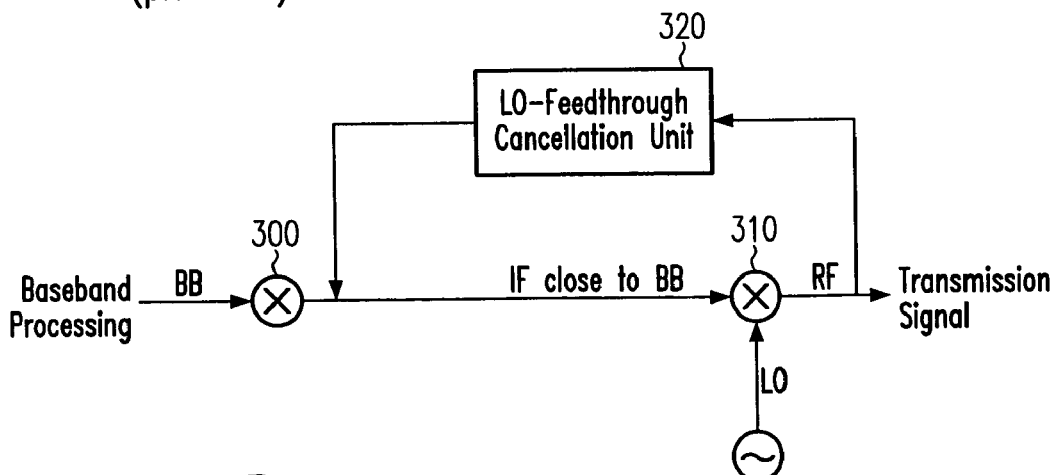
FIG. 3 is a simplified diagram illustrating the low-IF approach.
Figure 4:
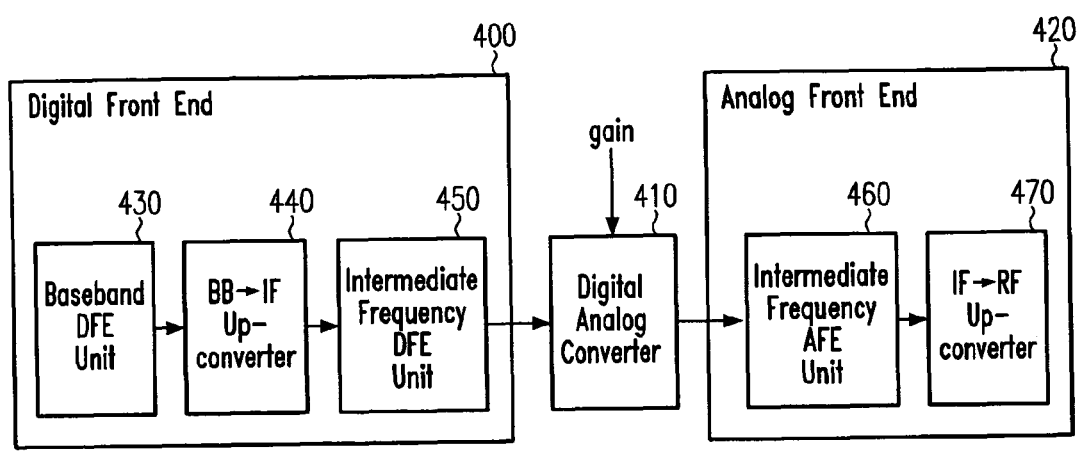
FIG. 4 is a block diagram depicting components of a data communications device according to an embodiment.

Referring first to FIG. 4, a block diagram is shown depicting the digital front end 400 and analog front end 420 of the data communications device (such as a WLAN transmitter) according to an embodiment. The digital and analog front ends 400, 420 are interconnected by means of a digital-to-analog converter (DAC) 410 that converts the digital output signal of the digital front end 400 to analog signals. The gain of the digital-to-analog converter 410 may be controlled by means of a gain control signal provided to the digital-to-analog converter 410.

In the embodiment, the upconversion from baseband to an intermediate frequency near the baseband frequency may be performed in the digital front end 400 and the upconversion from the intermediate frequency to RF may be performed in the analog front end 420. More particularly, the baseband signal carrying the information to be transmitted may be processed in the baseband DFE (Digital Front End) unit 430. The signal may then be passed to the upconverter 440 for being upconverted from baseband to the intermediate frequency. The resulting IF signal may be further processed by the intermediate frequency DFE unit 450. The IF signal may then be supplied to the digital-to-analog converter 410.

According to the embodiment, the analog signal that is output by the digital-to-analog converter 410 is supplied to an intermediate frequency AFE (Analog Front End) unit 460 within the analog front end 420. After further signal processing, the intermediate frequency AFE unit 460 may output the IF signal to the upconverter 470 for final upconversion to the transmission RF frequency.

It is to be noted that the digital-to-analog converter 410 of the present embodiment may be part of the digital front end 400. In another embodiment, the digital to analog converter 410 may be located in the analog front end 420.

In the present embodiment, the baseband DFE unit 430 may modulate the signals according to a spread spectrum modulation technique. One modulation scheme may be one complying with the IEEE 802.11b specification. In this mode, the signals may be Barker modulated or CCK modulated. Further, IEEE 802.11a/g modes may be used where an OFDM modulation scheme is applied.

Figure 5:
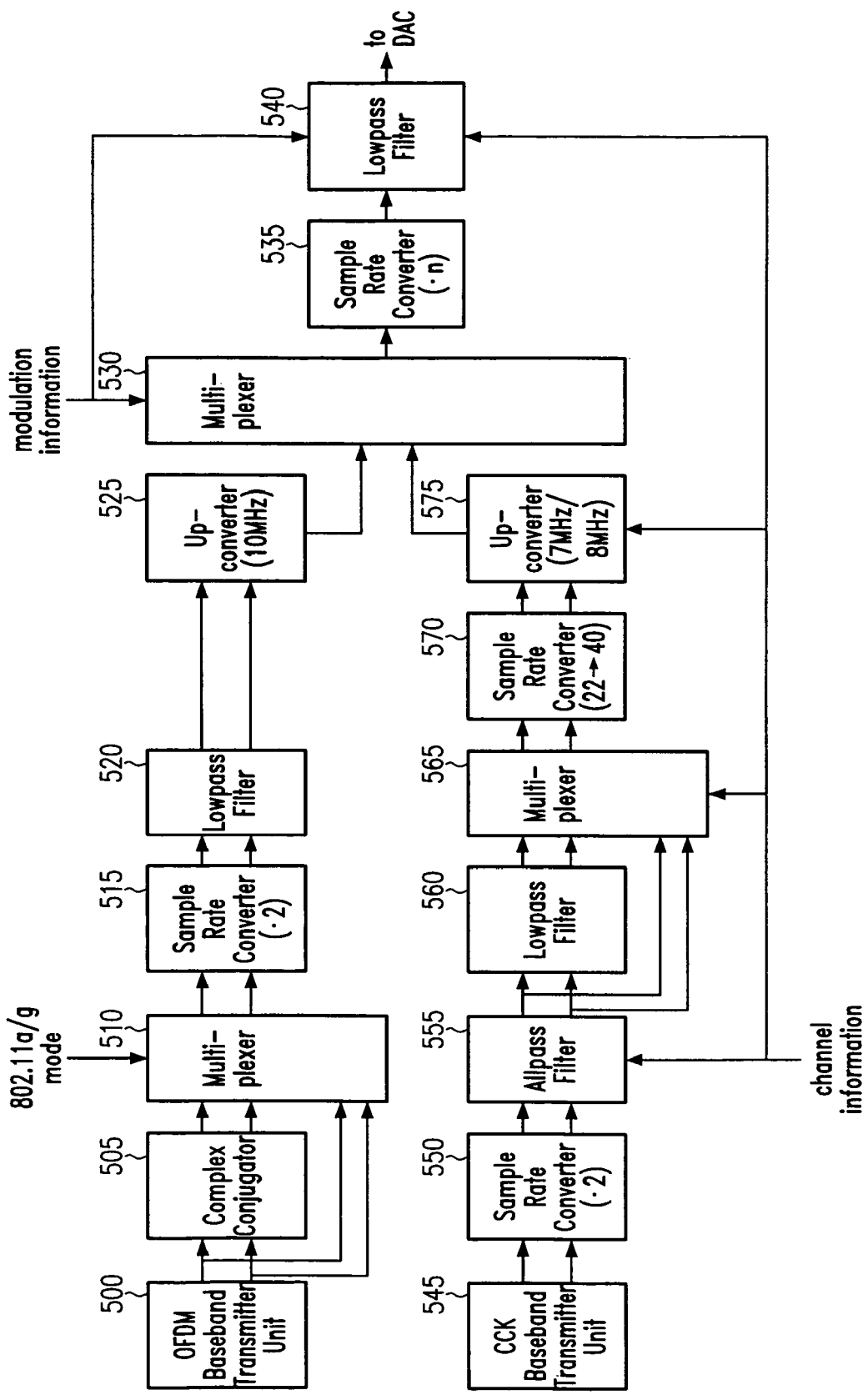
FIG. 5 is a block diagram illustrating the components of a digital front end section of the device shown in FIG. 4.

Referring now to FIG. 5, the components of the digital front end 400 shown in FIG. 4 are depicted in more detail. Double lines in FIG. 5 indicate complex signals while single lines refer to real-valued signals.

The baseband DFE unit 430 may comprise units 500 to 520 and 545 to 570 illustrated in FIG. 5. The upconverter 440 may include both upconverters 525 and 575. Further, the intermediate frequency DFE unit 450 may comprise units 530 to 540.

As apparent from FIG. 5, the digital front end 400 has two branches each having low-IF topology. In further embodiments, there may be more than just two branches.

In the first branch of FIG. 5, 802.11b compliant processing is performed. This branch comprises the CCK baseband transmitter unit 545, the sample rate converter 550, the allpass and lowpass filters 555, 560, the multiplexer 565, the sample rate converter 570, the upconverter 575, the multiplexer 530, the sample rate converter 535, and the lowpass filter 540. In the second branch, 802.11a/g compliant OFDM signals are processed. This branch comprises the OFDM baseband transmitter unit 500, the complex conjugator 505, the multiplexer 510, the sample rate converter 515, the lowpass filter 520, the upconverter 525, the multiplexer 530, the sample rate converter 535, and the lowpass filter 540.

Before discussing the various components in more detail, it is to be noted that the multiplexer 530, the sample rate converter 535, and the lowpass filter 540 are part of both branches. By having these units shared by both branches, circuit development and manufacturing costs are significantly reduced. It is to be noted that further components might also be designed in a shared fashion in further embodiments.

As can be seen from FIG. 5, the shared components 530 and 540 receive a modulation information signal. This signal indicates whether the current signal is being processed according to the 802.11b, a or g WLAN mode and allows the units to reconfigure their specific properties to properly fulfill the requirements of the respective modulation technique applied in each individual mode.

Discussing now the 802.11b branch, the baseband signal may either be Barker or CCK modulated in the CCK baseband transmitter unit 545. As a consequence, the modulated signal may be a complex sequence with a sample alphabet out of $\{-1, 1, -j, j\}$ at a rate of 11 MHz. This signal may be upsampled to 22 MHz (zero insert) in the sample rate converter 550 and additionally filtered in the allpass filter 555 and the lowpass filter 560.

This filtering may depend on the desired transmission channel. Therefore, a channel information signal may be provided to the allpass filter 555 and the multiplexer 565. In one embodiment, the transmission channel can be chosen from fourteen channels where channel 14 is a Japanese channel on which a B-90 bandwidth greater than 13.75 MHz is required for transmission.

For transmission on one of channels 1 to 13, the filtering in the allpass filter 555 may be based on FIR (Finite Impulse Response)-type filtering which combines both an approximation of Nyquist-type pulse shaping and non-linear phase prewarping. This may account for the 802.11b modulation accuracy requirements, assuming there is no receive filter for the reference receiver. In particular, phase prewarping may allow to cancel the group delay distortions caused by the highpass and polyphase filters of the analog front end 420 which decrease the modulation accuracy. For the transmission on one of channels 1 to 13, the multiplexer 565 may select the signal output by the allpass filter 555, bypassing the lowpass filter 560.

For transmission on the Japanese channel 14, the multiplexer 565 may select the signal provided by the lowpass filter 560. In this case, FIR pulse shaping may be replaced with IIR (Infinite Impulse Response) lowpass filtering in the lowpass filter 560. The lowpass filter 560 may have a normalized cutoff frequency above the Nyquist frequency of 5.5 MHz. This may allow for lowering the effect of group delay distortions caused by the filter. The FIR allpass filter 555 may serve for phase prewarping only when transmission on the Japanese channel 14 is selected.

In one embodiment, the FIR filter 555 may consist of twelve taps. Since in the described embodiment the input alphabet is $\{-1, 1, -j, j\}$ only, the implementation complexity of the filter is moderate. In this embodiment, the FIR filter 555 is an approximation of a raised cosine filter and an allpass with a specific group delay. In other embodiments, particularly when another input alphabet is used, other filters having a different number of taps may be used for the allpass filter 555.

The lowpass filter 560 is a third order multiplierless elliptic filter with a normalized cutoff frequency of about 8.6 MHz according to the present embodiment. Note that other filters may be used as well for the lowpass filter 560. For example, the lowpass filter 560 may be a multiplierless filter as described in L. D. Milić, IEEE Transactions on Signal Processing, Vol. 47, No. 2, February 1999, pp. 469 to 479.

The multiplexer 565 may provide the filtered signal to the sample rate converter 570. In the sample rate converter 570, the filtered sequence may additionally be converted to a signal processing rate of 40 MHz. According to the present embodiment, the sample rate converter 570 is a FIR filter having eight taps with periodically time varying coefficients. However, other implementations of the sample rate converter 570 are also possible.

The sequence leaving the sample rate converter 570 may be upconverted to a normalized IF frequency by the upconverter 575. The upconverter 575 may be tunable so that different IF frequencies may be used depending on the selected transmission channel. For this purpose, the channel information signal may also be provided to the upconverter 575. In the present embodiment, the IF frequency is 7 MHz for transmission on one of channels 1 to 13 and 8 MHz for transmission on the Japanese channel 14.

The use of 7 MHz for the intermediate frequency for channels 1 to 13 allows to meet the 802.11b spectrum mask requirements. For the Japanese channel 14, the intermediate frequency of 8 MHz allows to meet both the 802.11b spectrum mask requirements and the requirements for the B-90 bandwidth while providing real low-IF transmission, i.e., the use of an IF frequency near the baseband frequency. Further, for channels 1 to 13, the left-hand side of the frequency response of the frequency modulated signal is nearly zero. Such a signal is analytic and its real part contains all information.

Turning now to the 802.11a/g branch, the baseband signal may be OFDM modulated in the OFDM baseband transmitter unit 500. In contrast to the 802.11b baseband signal, the OFDM baseband signal may be a complex sequence of a larger sample alphabet determined by the fixed point resolution of the OFDM baseband transmitter unit 500. According to the present embodiment, the signal processing rate is 20 MHz.

For 802.11a compliant signal transmission, the baseband sequence leaving the OFDM baseband transmitter unit 500 may be complex conjugated by the complex conjugator 505. For 802.11g compliant signal transmission, however, the complex conjugator 505 may be bypassed. Therefore, the multiplexer 510 may be provided with a signal indicating whether the transmitter is operating in the 802.11a or 802.11g mode to select the proper signal.

The signal output by the multiplexer 510 may then be upsampled by the sample rate converter 515 and lowpass filtered in the lowpass filter 520. Then, the signal may be upconverted to the intermediate frequency by the upconverter 525. In the present embodiment, the normalized IF frequency in the 802.11a/g branch is 10 MHz.

The lowpass filter 520 may provide anti-image filtering in order to obtain an approximately analytic signal with respect to the IF modulation. Particularly, the anti-image filter 520 may be specified with a cutoff frequency of approximately 9.2 MHz rather than 10 MHz. The latter refers to a half-band filter with respect to the 40 MHz signal processing rate and is usually applied for factor-2-sampling rate conversion. In order to gain sufficient out-of-band-suppression, the transition to the stop-band is conventionally chosen to be very short. This, however, causes long impulse responses. Long impulse responses in turn usually affect the finite length of the guard interval, and, as a consequence, decrease the overall performance. Therefore, in the present embodiment, the cutoff frequency of the lowpass filter 520 has been slightly decreased to 9.2 MHz with a relaxed transition band to reduce the impulse response and thus increase the performance.

The lowpass filter 520 may be an IIR lowpass filter. According to the present embodiment, the lowpass filter 520 is implemented as a fifth order multiplierless elliptic filter. For example, the lowpass filter 520 may be an elliptic half-band filter as described in L. D. Milić, IEEE Transactions on Signal Processing, Vol. 47, No. 2, February 1999, pp. 469 to 479. This may allow for particularly simple implementation of the lowpass filter 520. However, other filter types may also be employed for the lowpass filter 520.

In the present embodiment, both the 802.11b branch and the 802.11a/g branch include the multiplexer 530, the sample rate converter 535 and the lowpass filter 540. The multiplexer 530 may be provided with a modulation information signal indicating whether the transmitter is operating in the 802.11b mode or in the 802.11a/g mode. Based on the modulation information signal, the multiplexer 530 may forward either the signal provided by the upconverter 525 or the signal provided by the upconverter 575 to the sample rate converter 535.

The real-valued low-IF signal output by the multiplexer 530 may be upsampled by the sample rate converter 535 by a multiplication factor of n which may be equal to or greater than 2. In the present embodiment, the multiplication factor n equals 2 and the resolution of the digital-to-analog converter 410 is 9 bits. This may allow to extend the effective frequency range in the digital domain 400. Further, this implementation may provide the advantage of allowing to achieve precise and significant lowpass filtering in the digital front end 400 and to avoid complex analog filters.

The lowpass filter 540 may be tunable in order to filter signals at different IF frequencies. The cutoff frequency of the lowpass filter 540 may be tuned based on the modulation information signal and the channel information signal, both provided to the lowpass filter 540. According to the present embodiment, the lowpass filter 540 may be used to filter signals at an IF frequency of 7 MHz when the transmitter is operating in the 802.11b mode for transmission on one of channels 1 to 13, at an IF frequency of 8 MHz when the transmitter is operating in the 802.11b mode for transmission on the Japanese channel 14, and at an IF frequency of 10 MHz when the transmitter is operating in the 802.11a/g mode. Further filter parameters of the lowpass filter 540 may also be selected based on the modulation information signal and/or the channel information signal.

The lowpass filter 540 may be implemented as an IIR lowpass filter and in particular as a fifth order multiplierless elliptic filter with switchable coefficients depending on the requirements on the spectrum mask according to the actual transmission mode. For example, the lowpass filter 540 may be designed according to L. D. Milić, IEEE Transactions on Signal Processing, Vol. 47, No. 2, February 1999, pp. 469 to 479. The lowpass filter 540 may further contribute sufficient attenuation, e.g., about 30 dB, for both image rejection and spectrum mask filtering.

The digital to analog converter 410 may follow the lowpass filter 540 in the signal path. Running with an appropriate clock rate, the digital-to-analog converter 410 may convert the discrete-time signal leaving the digital front end 400 into the analog continuous-time domain. It is to be noted that the interface between the baseband and radio front end does not necessarily have to be at the digital-to-analog converter 410. In an embodiment, this interface may be digital and located between the multiplexer 430 and the sample rate converter 535. In such an embodiment, the radio front end contains some discrete time processing and the interface sampling is 40 MHz with parallel transmission of 10 bits quantization.

The analog signal leaving the digital-to-analog converter 410 may be supplied to the analog front end 420. Real-valued low-IF transmission may be used to avoid extensive high Q-factor on-chip and/or off-chip bandpass filtering. Analog low-IF filtering may be implemented to fulfill physical medium dependent transmission parameters according to 802.11a/b/g. Further, the use of three different low-IF frequencies, e.g., 7 MHz, 8 MHz and 10 MHz according to the present embodiment, may ease the fulfillment of image rejection requirements. Particularly, these specific frequencies may allow for reducing the requirements on the image rejection section.

The task of the analog front end 520 may be the conversion of a real-valued, discrete-time low-IF signal to a continuous-time single side-band signal at a given IF frequency according to the selected transmission frequency. In the present embodiment, this operation includes the generation of a complex-valued signal and further filtering to fulfill transmission spectrum mask requirements.

Figure 6:
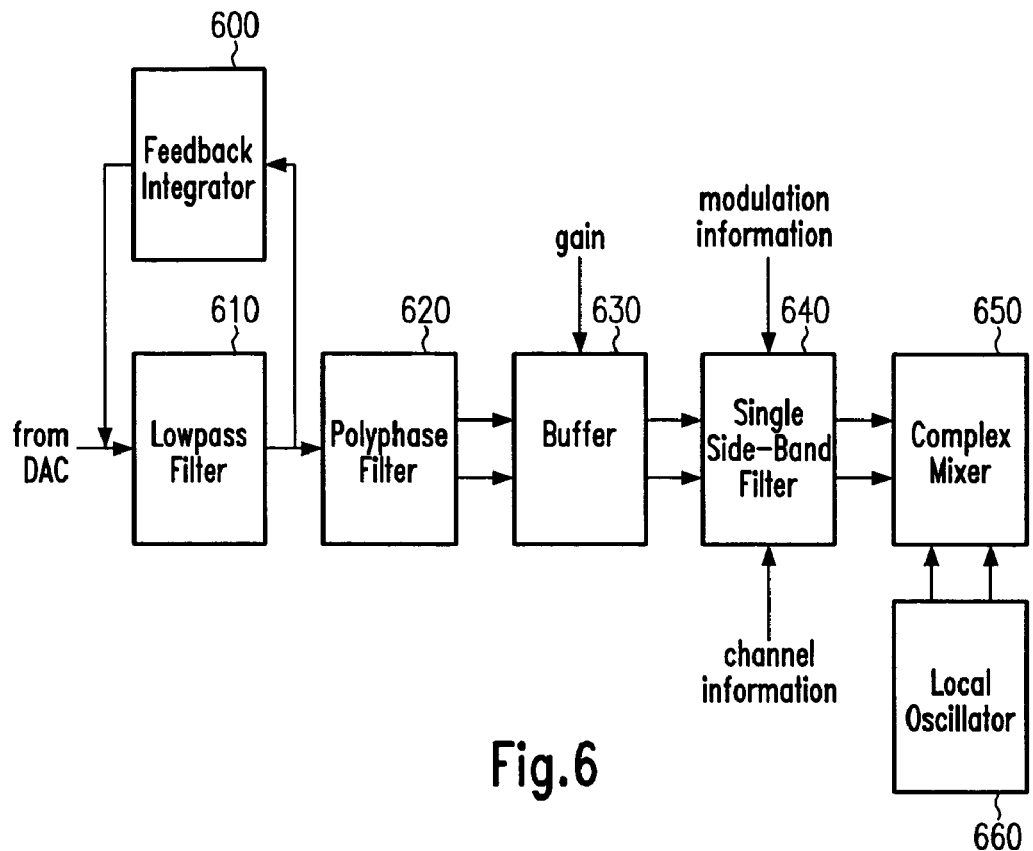
FIG. 6 is a block diagram illustrating the components of an analog front end section of the device shown in FIG. 4.

The components of an analog front end 420 according to an embodiment are shown in FIG. 6 wherein double lines indicate complex signals, whereas single lines refer to real-valued signals. The intermediate frequency AFE unit 460 may comprise units 600 to 640, while the upconverter 470 may contain the complex mixer 650. The local oscillator 660 may also be provided within the upconverter 470 or at a different location within or out of the analog front end 420.

The analog signal output by the digital-to-analog converter 410 may be supplied to the lowpass filter 610 which attenuates images resulting from the digital-to-analog conversion. Specifically, significant images may arise at frequencies equal to or above an image frequency corresponding to the frequency of the digital-to-analog converter 410 minus the signal frequency. In the embodiment, the lowpass filter 610 is implemented as a biquad filter. Taking into account the bandwidth of the signal, this may provide sufficient attenuation.

In order to suppress low frequency signals caused by the selected frequency plan and the digital signal processing, the signal leaving the lowpass filter 610 may be provided to the feedback integrator 600. The feedback integrator 600 may further allow for reducing lowpass filter noise and flicker noise introduced by the digital-to-analog converter 410. This may allow to avoid any impact on the wanted signal, which has a frequency range between 1 MHz and 18.125 MHz.

Succeeding the image rejection and attenuation of low frequency signals by the lowpass filter 610 and the feedback integrator 600, respectively, the signal may be converted from a real-valued to a complex-valued signal. According to the present embodiment, this conversion is realized in two steps.

The first step may comprise polyphase filtering in the polyphase filter 620. In particular, the polyphase filter 620 may generate balanced quadrature phases from the single real-valued signal provided by the lowpass filter 610, and may discriminate between positive and negative frequencies. Either the positive or the negative image may be rejected by the polyphase filter 620. In the present embodiment, the polyphase filter 620 is implemented as a four-stage passive polyphase filter. However, depending on the desired amount of image rejection and/or bandwidth of image rejection, the number of polyphase filter stages may be varied.

The second step of the real-to-complex signal conversion may be performed by the single side-band filter 640. This filter may act as a complex bandpass filter. It may select one band either located at positive or negative frequencies. All other frequencies, positive as well as negative frequencies, may be rejected by the single side-band filter 640. For this purpose, the single side-band filter may be provided with the modulation information signal indicating whether the transmitter is operating in the 802.11b mode or in the 802.11a/g mode as well as with the channel information signal indicating on which channel the signal is to be transmitted. Thus, the single side-band filter 640 may allow for single side-band filtering signals at different intermediate frequencies, e.g., at 7 MHz, 8 MHz and 10 MHz according to the present embodiment. The single side-band filter 640 may be implemented as an active three-stage single side-band filter.

Both the polyphase filter 620 and the single side-band filter 640 may be selected and configured to provide image rejection with sufficient margin of about 15 dB compared to the specification requirements. A buffer 630 may be interposed between the polyphase filter 620 and the single side-band filter 640. The gain of the buffer 630 may be adjustable based on a gain signal provided to the buffer 630.

Finally, the signal may be upconverted from the intermediate frequency to the desired transmission RF frequency. To this end, the signal output by the single side-band filter 640 may be mixed in the complex mixer 650 with the signal provided by the local oscillator 660. In the embodiment, the complex mixer 650 is a dual quadrature upconversion mixer.

Figure 7:
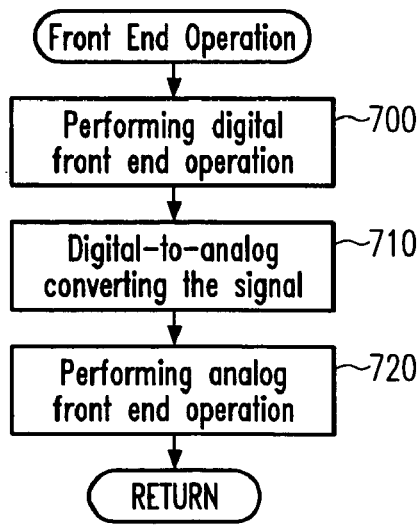
FIG. 7 is a flow chart illustrating a process of operating the data communications device shown in FIGS. 4, 5 and 6 according to an embodiment.

Referring now to FIG. 7, a flow chart is provided illustrating the process of performing multi-mode low-IF transmission according to the embodiment. In step 700, digital signal processing may be performed by the digital front end 400. Then, in step 710, digital-to-analog conversion may be performed on the signal by the digital-to-analog converter 410. Following the digital-to-analog conversion, further signal processing may be achieved by the analog front end 420 in step 720.

Figure 8:
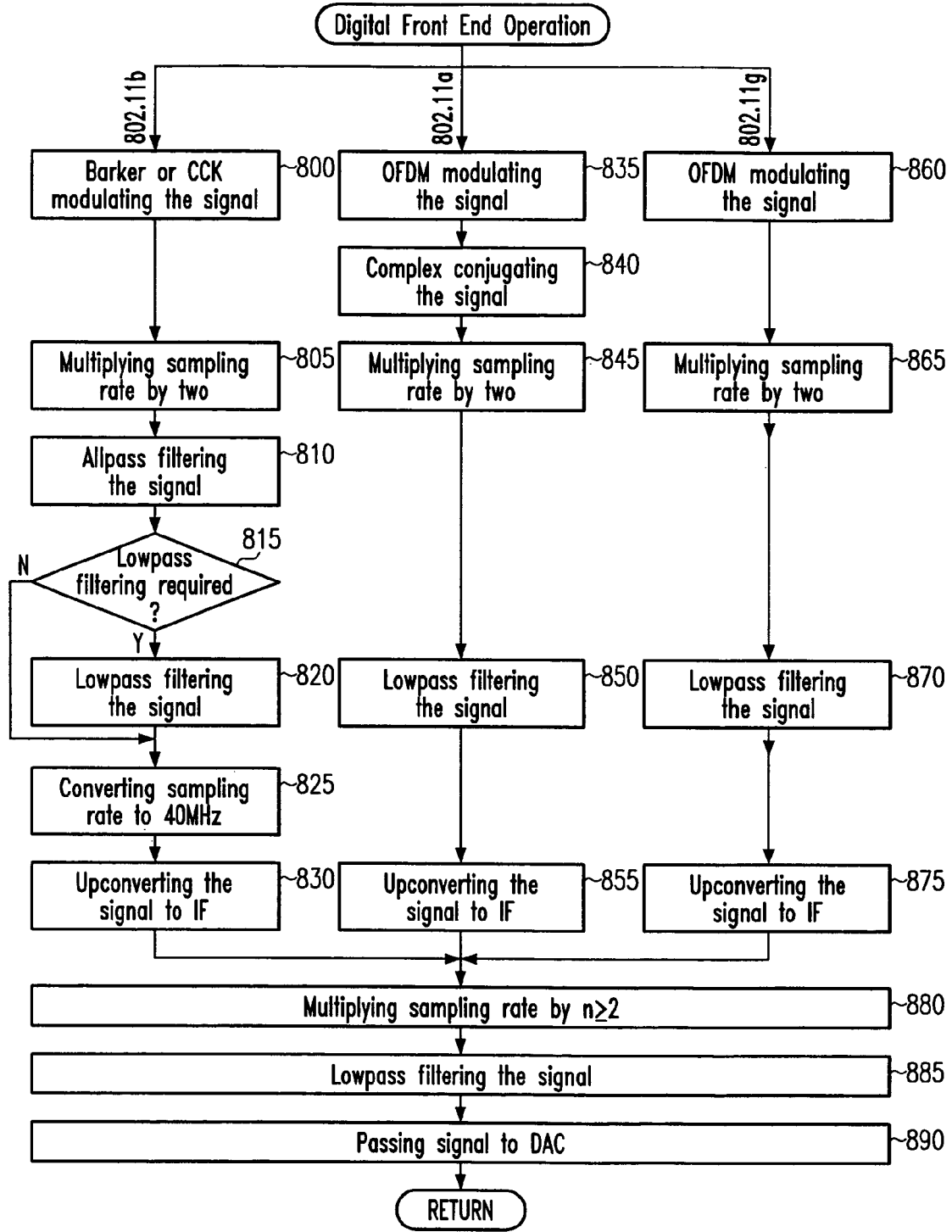
FIG. 8 is a flow chart illustrating the step of operating the digital front end section of FIG. 7 in more detail.

FIG. 8 depicts the digital signal processing that may be performed by the digital front end 400 according to the embodiment in more detail.

When the transmitter is operating in the 802.11b mode, the signal may first be Barker or CCK modulated in step 800. Then, the sampling rate may be multiplied by two in step 805 and the signal may be allpass filtered in step 810. In step 815, it may be queried whether lowpass filtering is required following the allpass filtering step 810. If so, i.e., if the signal is to be transmitted on the Japanese channel 14 of the present embodiment, lowpass filtering may be accomplished in step 820. Otherwise, if the signal is to be transmitted on one of channels 1 to 13 of the embodiment, the lowpass filtering step 820 may be bypassed. Then, in step 825, the sampling rate may be converted from 22 MHz to 40 MHz and the signal may be upconverted to IF frequency in step 830.

When the transmitter is operating in the 802.11a mode, the signal may be OFDM modulated in step 835. Following the OFDM modulation, the signal may be complex conjugated in step 840. The sampling rate may be multiplied by two in step 845. Then, the signal may be lowpass filtered in step 850 and upconverted to IF frequency in step 855.

In the 802.11g mode, the signal may be OFDM modulated in step 860. Following multiplication of the sampling rate by two in step 865 and lowpass filtering of the signal in step 870, the signal may be upconverted to IF frequency in step 875.

In either transmission mode, i.e., in the 802.11b, 802.11a, as well as 802.11g mode, the upconversion of the signal to IF frequency in steps 830, 855 and 875, respectively, may be followed by further multiplication of the sampling rate in step 880. According to the present embodiment, the sampling rate is multiplied in step 880 by a multiplication factor $n \geq 2$. Then, in step 885 the signal may be lowpass filtered. Upon being lowpass filtered, the signal may be passed to the digital to analog converter 410 in step 890.

Figure 9:
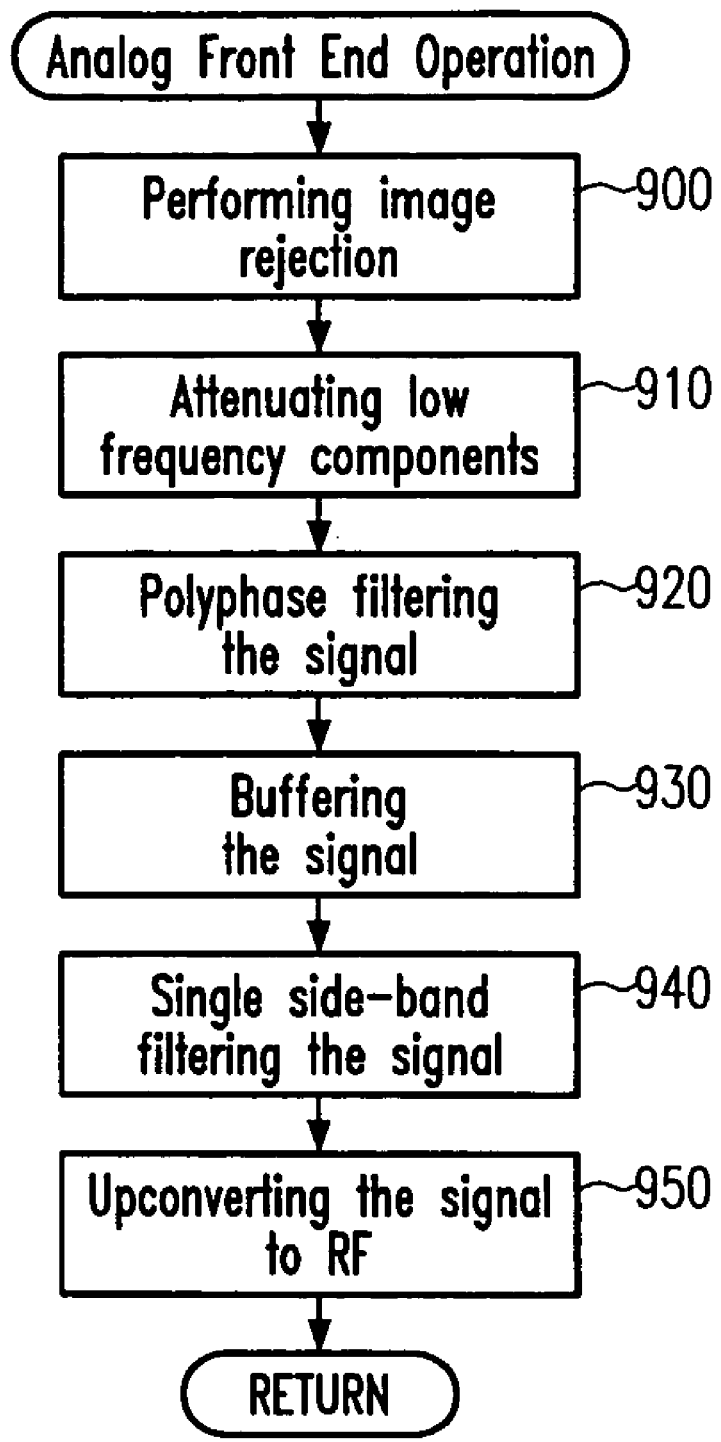
FIG. 9 is a flow chart illustrating the step of operating the analog front end section of FIG. 7 in more detail.

After digital-to-analog conversion in the digital-to-analog converter 410, the signal may be further processed in the analog front end 420. FIG. 9 illustrates this analog signal processing according to an embodiment. In step 900, image rejection may be performed. Then, in step 910, low frequency components imposed on the signal may be attenuated. The signal may be polyphase filtered in step 920 and single side-band filtered in step 940. Between the polyphase and single side-band filtering steps 920 and 940, the signal may be buffered in step 930. Finally, the signal may be upconverted from the intermediate frequency to the desired transmission RF frequency in step 950.

As can be seen from the above description of embodiments, a low-IF multi-mode transmitter front end has been presented that may circumvent impairments caused by I/Q imbalances, flicker noise and static or dynamic DC offset. The combination of filters as well as the selection of parameters of the embodiments may allow to reduce the implementation effort as well as increase flexibility and reliability.

While the invention has been described with respect to the physical embodiments constructed in accordance therewith, it will be apparent to those skilled in the art that various modifications, variations and improvements of the present invention may be made in the light of the above teachings and within the purview of the appended claims without departing from the scope of the invention. In addition, those areas in which it is believed that those of ordinary skill in the art are familiar, have not been described herein in order to not unnecessarily obscure the invention described herein. Accordingly, it is to be understood that the invention is not to be limited by the specific illustrative embodiments, but only by the scope of the appended claims.

What is claimed is:

1. A WLAN (Wireless Local Area Network) transmitter capable of transmitting data signals modulated in accordance with an individual one of at least two different modulation schemes, said WLAN transmitter comprising:
   a front end section having a low-IF (Intermediate Frequency) topology and including a digital front end unit, one analog front end unit, and a DAC (digital-to-analog converter) coupling said digital front end unit to said analog front end unit, wherein said digital front end unit comprises:
      a first signal processing branch configured to process transmission data signals modulated in accordance with a first one of said at least two different modulation schemes,
      a second signal processing branch configured to process transmission data signals modulated in accordance with a second one of said at least two different modulation schemes, and a multiplexer having first and second inputs coupled to receive digital signals processed in the first and second processing branches, respectively, and configured to select one of the first and second inputs depending on which of the at least two different modulation schemes is being applied, wherein said analog front end unit comprises:
one single signal processing branch coupled to receive analog signals from the DAC and configured to process transmission data signals modulated in accordance with any one of said at least two different modulation schemes;
wherein said single signal processing branch of said analog front end unit is arranged to receive a signal indicative of which one of said at least two different modulation schemes is currently applied to the transmission data signals.

2. The WLAN transmitter of claim 1, wherein said single signal processing branch of said analog front end unit comprises a single side-band filter unit for image rejection.

3. The WLAN transmitter of claim 2, wherein said single side-band filter unit has a frequency response selectively chosen in dependence on the indicated modulation scheme.

4. The WLAN transmitter of claim 2, wherein said single side-band filter unit comprises at least one complex bandpass filter.

5. The WLAN transmitter of claim 1, wherein said WLAN transmitter is configured to transmit said data signals on an individual one of at least two transmission channels having different transmission frequencies, and wherein said single signal processing branch of said analog front end unit is arranged to receive a signal indicative of which one of said at least two transmission channels is currently employed for transmitting the data signals.

6. The WLAN transmitter of claim 5, wherein said single signal processing branch of said analog front end unit comprises a single side-band filter unit for image rejection, and wherein said single side-band filter unit has a frequency response selectively chosen in dependence on the indicated transmission channel.

7. The WLAN transmitter of claim 1, wherein said first signal processing branch and said second signal processing branch of said digital front end unit share one or more units, and wherein at least one of said one or more units is connected to receive a signal indicative of which one of said at least two different modulation schemes is currently applied to the transmission data signals.

8. The WLAN transmitter of claim 7, wherein said one or more units comprise a shared lowpass filter unit for image rejection.

9. The WLAN transmitter of claim 8, wherein said shared lowpass filter unit has a cutoff frequency selectively chosen in dependence on the indicated modulation scheme.

10. The WLAN transmitter of claim 8, wherein said shared lowpass filter unit comprises at least one digital IIR (Infinite Impulse Response) filter.

11. The WLAN transmitter of claim 10, wherein said at least one digital IIR filter is an elliptic IIR filter.

12. The WLAN transmitter of claim 8, wherein said one or more units further comprise a shared multiplexer unit for selectively connecting said shared lowpass filter unit to units of said first or second signal processing branch of said digital front end unit in dependence on the indicated modulation scheme.

13. The WLAN transmitter of claim 12, wherein said one or more units comprise a shared sample rate converter interposed between said shared multiplexer unit and said shared lowpass filter unit arranged to convert the sample rate up to a rate suitable for processing the transmission data signals by said shared lowpass filter unit.

14. The WLAN transmitter of claim 7, capable of transmitting said data signals on an individual one of at least two transmission channels having different transmission frequencies, and wherein at least one of said one or more units is connected to receive a signal indicative of which one of said at least two transmission channels is currently employed for transmitting the data signals.

15. The WLAN transmitter of claim 14, wherein said one or more units comprise a shared lowpass filter unit for image rejection, and wherein said shared lowpass filter unit has a cutoff frequency selectively chosen in dependence on the indicated transmission channel.

16. The WLAN transmitter of claim 1, wherein said first one of said at least two different modulation schemes is a CCK (Complementary Code Keying) modulation scheme.

17. The WLAN transmitter of claim 1, wherein said first one of said at least two different modulation schemes is a Barker modulation scheme.

18. The WLAN transmitter of claim 1, wherein said first signal processing branch of said digital front end unit is arranged to process transmission data signals modulated in accordance with the IEEE 802.11b specification.

19. The WLAN transmitter of claim 1, wherein said second one of said at least two different modulation schemes is an OFDM (Orthogonal Frequency Division Multiplexing) modulation scheme.

20. The WLAN transmitter of claim 1, wherein said second signal processing branch of said digital front end unit is arranged to process transmission data signals modulated in accordance with the IEEE 802.11a and/or 802.11g specifications.

21. The WLAN transmitter of claim 1, wherein said first signal processing branch of said digital front end unit comprises a baseband transmitter unit arranged to modulate the transmission data signals according to said first one of said at least two different modulation schemes.

22. The WLAN transmitter of claim 1, wherein said first signal processing branch of said digital front end unit further comprises at least one sample rate converter arranged to convert the sample rate up to a rate suitable for processing the transmission data signal by a unit following the at least one sample rate converter in said first signal processing branch.

23. The WLAN transmitter of claim 1, wherein said first signal processing branch of said digital front end unit comprises an allpass filter unit for phase prewarping and/or pulse shaping the transmission data signals.

24. The WLAN transmitter of claim 23, wherein said allpass filter unit comprises at least one digital FIR (Finite Impulse Response) filter.

25. The WLAN transmitter of claim 23, capable of transmitting said data signals on an individual one of at least two transmission channels having different transmission frequencies, and wherein said allpass unit is connected to receive a signal indicative of which one of said at least two transmission channels is currently employed for transmitting the data signals.

26. The WLAN transmitter of claim 23, wherein said first signal processing branch of said digital front end unit further comprises a lowpass filter unit for pulse shaping the transmission data signal.

27. The WLAN transmitter of claim 26, wherein said lowpass filter unit comprises at least one digital IIR filter.

28. The WLAN transmitter of claim 27, wherein said at least one digital IIR filter is an elliptic IIR filter.

29. The WLAN transmitter of claim 26, wherein the WLAN transmitter is configured to transmit said data signals on an individual one of at least two transmission channels having different transmission frequencies, wherein said first signal processing branch of said digital front end unit further comprises a multiplexer unit connected to receive a signal indicative of which one of said at least two transmission channels is currently employed for transmitting the data signals, and wherein said multiplexer unit is arranged to selectively connect said allpass filter unit or said lowpass filter unit to a unit following the multiplexer unit in said first signal processing branch in dependence on the indicated transmission channel.

30. The WLAN transmitter of claim 1, wherein said first signal processing branch of said digital front end unit further comprises an upconverter unit arranged to receive the transmission data signals having a baseband frequency and to convert the frequency of said transmission data signals to an IF frequency near the baseband frequency.

31. The WLAN transmitter of claim 30, capable of transmitting said data signals on an individual one of at least two transmission channels having different transmission frequencies, wherein said upconverter unit is connected to receive a signal indicative of which one of said at least two transmission channels is currently employed for transmitting the data signals, and wherein said upconverter unit is further arranged to convert the frequency of said transmission data signals to an IF frequency selected in dependence on the indicated transmission channel.

32. The WLAN transmitter of claim 1, wherein said second signal processing branch of said digital front end unit comprises a baseband transmitter unit arranged to modulate the transmission data signals according to said second one of said at least two different modulation schemes.

33. The WLAN transmitter of claim 32, wherein said second signal processing branch of said digital front end unit further comprises a complex conjugator unit arranged to complex conjugate the transmission data signals.

34. The WLAN transmitter of claim 33, wherein said second signal processing branch of said digital front end unit further comprises a multiplexer unit connected to receive a signal indicative of which one of said at least two different modulation schemes is currently applied to the transmission data signals, and wherein said multiplexer unit is arranged to selectively connect said baseband transmitter unit or said complex conjugator unit to a unit following the multiplexer unit in said second signal processing branch in dependence on the indicated modulation scheme.

35. The WLAN transmitter of claim 1, wherein said second signal processing branch of said digital front end unit further comprises a sample rate converter arranged to convert the sample rate up to a rate suitable for processing the transmission data signal by a unit following the sample rate converter in said second signal processing branch.

36. The WLAN transmitter of claim 1, wherein said second signal processing branch of said digital front end unit further comprises a lowpass filter unit for image rejection.

37. The WLAN transmitter of claim 36, wherein said lowpass filter unit comprises at least one digital IIR filter.

38. The WLAN transmitter of claim 37, wherein said digital IIR filter is an elliptic IIR filter.

39. The WLAN transmitter of claim 1, wherein said second signal processing branch of said digital front end unit comprises an upconverter unit arranged to receive the transmission data signals having a baseband frequency and to convert the frequency of said transmission data signals to an IF frequency near the baseband frequency.

40. The WLAN transmitter of claim 1, wherein said single signal processing branch of said analog front end unit comprises a lowpass filter unit for image rejection.

41. The WLAN transmitter of claim 40, wherein said lowpass filter unit comprises at least one biquad filter.

42. The WLAN transmitter of claim 1, wherein said single signal processing branch of said analog front end unit comprises a feedback integrator unit for attenuating low frequency components imposed on the transmission data signals.

43. The WLAN transmitter of claim 1, wherein said single signal processing branch of said analog front end unit comprises a polyphase filter unit for generating balanced quadrature phases from real-valued transmission data signals provided thereto.

44. The WLAN transmitter of claim 1, wherein said single signal processing branch of said analog front end unit comprises a buffer for buffering the transmission data signals.

45. The WLAN transmitter of claim 1, wherein said single signal processing branch of said analog front end unit comprises a complex mixer arranged to receive the transmission data signals having an IF frequency and to convert the frequency of said transmission data signals to a transmission RF (Radio Frequency) frequency.

46. A method of processing transmission data signals in a WLAN (Wireless Local Area Network) data communications device, said data signals being modulated in accordance with either one of at least two different modulation schemes, said WLAN data communications device comprising a front end section having a low-IF (Intermediate Frequency) topology and including a digital front end unit and an analog front end unit, said method comprising:

determining which one of said at least two different modulation schemes is applied to a transmission data signal;

performing digital low-IF processing of said transmission data signal in a first signal processing branch of said digital front end unit if it is determined that a first one of said at least two different modulation schemes is applied, or in a second signal processing branch of said digital front end unit if it is determined that a second one of said at least two different modulation schemes is applied;

selecting, via a multiplexer, discrete time signals from the first signal processing branch if the first modulation scheme is applied;

selecting, via the multiplexer, discrete time signals from the second signal processing branch if the second modulation scheme is applied;

performing digital-to-analog conversion to convert discrete-time signals provided by said digital front end unit into a continuous-time signal and outputting the converted signal to said analog front end unit; and performing all analog low-IF processing of said transmission data signal subsequent to digital-to-analog conversion in one single signal processing branch of said analog front end unit for the one of the first or second modulation schemes that is applied; wherein performing analog low-IF processing comprises providing to said analog front end unit a signal indicative of which one of said at least two different modulation schemes is applied to the transmission data signal.

47. The method of claim 46, wherein performing analog low-IF processing further comprises performing single sideband filtering for image rejection.

48. The method of claim 47, wherein performing single side-band filtering comprises applying a frequency response selectively chosen in dependence on the indicated modulation scheme.

49. The method of claim 47, wherein performing single side-band filtering comprises operating at least one complex bandpass filter.

50. The method of claim 46, further comprising transmitting the data signal on an individual one of at least two transmission channels having different transmission frequencies, and wherein performing analog low-IF processing comprises providing to said analog front end unit a signal indicative of which one of said at least two transmission channels is employed for transmitting the data signal.

51. The method of claim 50, wherein performing analog low-IF processing further comprises single side-band filtering for image rejection, and wherein performing single sideband filtering comprises applying a frequency response selectively chosen in dependence on the indication transmission channel.

52. The method of claim 46, wherein performing digital low-IF processing comprises operating one or more units shared by said first signal processing branch and said second signal processing branch and providing to at least one of said one or more units a signal indicative of which one of said at least two different modulation schemes is applied to the transmission data signal.

53. The method of claim 52, wherein operating said one or more units comprises performing lowpass filtering for image rejection.

54. The method of claim 53, wherein performing lowpass filtering comprises applying a cutoff frequency selectively chosen in dependence on the indicated modulation scheme.

55. The method of claim 53, wherein performing lowpass filtering comprises operating at least one digital IIR (Infinite Impulse Response) filter.

56. The method of claim 55, wherein operating said at least one digital IIR filter comprises operating an elliptic IIR filter.

57. The method of claim 53, wherein operating said one or more units further comprises selectively connecting a shared lowpass filter unit for performing said lowpass filtering to units of said first or second signal processing branch in dependence on the indicated modulation scheme.

58. The method of claim 57, wherein operating said one or more units further comprises converting the sampling rate of the selectively chosen transmission data signal down to a rate suitable for processing the transmission data signal by said shared lowpass filter unit.

59. The method of claim 52, further comprising transmitting the data signal on an individual one of at least two transmission channels having different transmission frequencies, and wherein operating said one or more units comprises providing to at least one of said one or more units a signal indicative of which one of said at least two transmission channels is employed for transmitting the data signal.

60. The method of claim 59, wherein operating said one or more units comprises performing lowpass filtering for image rejection and applying a cutoff frequency selectively chosen in dependence on the indicated transmission channel.

61. The method of claim 46, wherein said first one of said at least two different modulation schemes is a CCK (Complementary Code Keying) modulation scheme.

62. The method of claim 46, wherein said first one of said at least two different modulation schemes is a Barker modulation scheme.

63. The method of claim 46, wherein said first signal processing branch processes transmission data signals in accordance with the IEEE 802.11b specification.

64. The method of claim 46, wherein said second one of said at least two different modulation schemes is an OFDM (Orthogonal Frequency Division Multiplexing) modulation scheme.

65. The method of claim 46, wherein said second signal processing branch processes transmission data signals modulated in accordance with the IEEE 802.11a and/or 802.11g specifications.

66. The method of claim 46, wherein performing digital low-IF processing in said first signal processing branch comprises modulating the transmission data signal according to said first one of said at least two different modulation schemes.

67. The method of claim 46, wherein performing digital low-IF processing in said first signal processing branch comprises converting at least once the sample rate in said first signal processing branch up to a rate suitable for processing the transmission data signal following the sample rate conversion in said first signal processing branch.

68. The method of claim 46, wherein performing digital low-IF processing in said first signal processing branch comprises performing allpass filtering for phase prewarping and/or pulse shaping the transmission data signal.

69. The method of claim 68, wherein performing allpass filtering comprises operating at least one digital FIR (Finite Impulse Response) filter.

70. The method of claim 68, further comprising transmitting the data signal on an individual one of at least two transmission channels having different transmission frequencies, and wherein performing allpass filtering comprises providing to an allpass filter a signal indicative of which one of said at least two transmission channels is employed for transmitting the data signal.

71. The method of claim 68, wherein performing digital low-IF processing in said first signal processing branch further comprises performing lowpass filtering for pulse shaping the transmission data signal.

72. The method of claim 71, wherein performing lowpass filtering comprises operation at least one digital IIR filter.

73. The method of claim 72, wherein operating said at least one digital IIR filter comprises operating an elliptic IIR filter.

74. The method of claim 71, further comprising transmitting the data signal on an individual one of at least two transmission channels having different transmission frequencies, wherein performing digital low-IF processing in said first signal processing branch further comprises providing to a multiplexer unit a signal indicative of which one of said at least two transmission channels is employed for transmitting the data signal, and wherein performing digital low-IF processing in said first signal processing branch further comprises selectively connecting, by said multiplexer unit, an allpass filter unit performing said allpass filtering or a lowpass filter unit performing said lowpass filtering to a unit following said multiplexer unit in said first signal processing branch.

75. The method of claim 46, wherein performing digital low-IF processing in said first signal processing branch comprises receiving said transmission data signal having a baseband frequency by an upconverter unit and upconverting the frequency of said transmission data signal to an IF frequency near said baseband frequency.

76. The method of claim 75, further comprising transmitting the data signal on an individual one of at least two transmission channels having different transmission frequencies, wherein upconverting the frequency of said transmission data signal comprises providing to said upconverter unit a signal indicative of which one of said at least two transmission channels is employed for transmitting the data signal and upconverting the frequency of the transmission data signal to an IF frequency selected in dependence on the indicated transmission channel.

77. The method of claim 46, wherein performing digital low-IF processing in said second signal processing branch comprises modulating the transmission data signal according to said second one of said at least two different modulation schemes.

78. The method of claim 77, wherein performing digital low-IF processing in said second signal processing branch further comprises complex conjugating the transmission data signal.

79. The method of claim 78, wherein performing digital low-IF processing in said second signal processing branch further comprises providing to a multiplexer unit a signal indicative of which one of said at least two different modulation schemes is applied to the transmission data signal and selectively connecting, by said multiplexer unit, a baseband transmitter unit performing said modulation or a complex conjugator unit performing said complex conjugation to a unit following the multiplexer unit in said second signal processing branch in dependence on the indicated modulation scheme.

80. The method of claim 46, wherein performing digital low-IF processing in said second signal processing branch comprises converting the sample rate in said second signal processing branch up to a rate suitable for processing the transmission data signal following the sample rate conversion in said second signal processing branch.

81. The method of claim 46, wherein performing digital low-IF processing in said second signal processing branch comprises performing lowpass filtering for image rejection.

82. The method of claim 81, wherein performing lowpass filtering comprises operating at least one digital IIR filter.

83. The method of claim 82, wherein operating said at least one digital IIR filter comprises operating an elliptic IIR filter.

84. The method of claim 46, wherein performing digital low-IF processing in said second signal processing branch comprises receiving said transmission data signal having a baseband frequency by an upconverter unit and upconverting the frequency of said transmission data signal to an IF frequency near said baseband frequency.

85. The method of claim 46, wherein performing analog low-IF processing in said single signal processing branch comprises performing lowpass filtering for image rejection.

86. The method of claim 85, wherein performing lowpass filtering comprises operating at least one biquad filter.

87. The method of claim 46, wherein performing analog low-IF processing in said single signal processing branch comprises performing feedback integration for attenuating low frequency components imposed on the transmission data signal.

88. The method of claim 46, wherein performing analog low-IF processing in said single signal processing branch comprises performing polyphase filtering for generating balanced quadrature phases from a real-valued transmission signal.

89. The method of claim 46, wherein performing analog low-IF processing in said single signal processing branch comprises buffering the transmission data signal.

90. The method of claim 46, wherein performing analog low-IF processing in said single signal processing branch comprises receiving the transmission data signal having an IF frequency by a complex mixer and converting the frequency of said transmission data signal to a transmission RF (Radio Frequency) frequency.

91. An integrated circuit chip having circuitry for processing transmission data signals modulated in accordance with an individual one of at least two different modulation schemes, said circuitry comprising:
 a front end circuit having a low-IF (Intermediate Frequency) topology and including a digital front end circuit, one analog front end circuit, and a DAC (digital-to-analog converter) coupling said digital front end unit to said analog front end unit, wherein said digital front end circuit comprises:
  a first signal processing branch configured to process transmission data signals modulated in accordance with a first one of said at least two different modulation schemes,
  a second signal processing branch configured to process transmission data signals modulated in accordance with a second one of said at least two different modulation schemes, and
  a multiplexer having first and second inputs coupled to receive digital signals processed in the first and second processing branches, respectively, and configured to select one of the first and second inputs depending on which of the at least two different modulation schemes is being applied,
 wherein said analog front end circuit comprises:
  one single signal processing branch coupled to receive analog signals from the DAC and configured to process transmission data signals modulated in accordance with any one of said at least two different modulation schemes;
  wherein said single signal processing branch of said analog front end unit is arranged to receive a signal indicative of which one of said at least two different modulation schemes is currently applied to the transmission data signals.

* * * * *